(12) United States Patent
Piani

(10) Patent No.: US 12,528,685 B2
(45) Date of Patent: Jan. 20, 2026

(54) DEVICE FOR SEPARATING A LOAD FROM THE PALLET SUPPORTING IT

(71) Applicant: TOPPY S.R.L., Valsamoggia (IT)

(72) Inventor: Daniele Piani, Monte San Pietro (IT)

(73) Assignee: TOPPY S.R.L., Valsamoggia (IT)

( * ) Notice: Subject to any disclaimer, the term of this patent is extended or adjusted under 35 U.S.C. 154(b) by 355 days.

(21) Appl. No.: 18/279,644

(22) PCT Filed: Dec. 23, 2021

(86) PCT No.: PCT/EP2021/087533
§ 371 (c)(1),
(2) Date: Aug. 31, 2023

(87) PCT Pub. No.: WO2022/184309
PCT Pub. Date: Sep. 9, 2022

(65) Prior Publication Data
US 2024/0140769 A1    May 2, 2024

(30) Foreign Application Priority Data

Mar. 5, 2021 (IT) ........................ 102021000005171

(51) Int. Cl.
*B66F 9/18* (2006.01)
(52) U.S. Cl.
CPC .................................. *B66F 9/183* (2013.01)
(58) Field of Classification Search
CPC ............... B66F 9/183; B65H 31/3045; B65H 2301/42242
USPC .................................... 414/621, 790.2, 795.2
See application file for complete search history.

(56) References Cited

U.S. PATENT DOCUMENTS

| | | | |
|---|---|---|---|
| 2,601,933 A | | 7/1952 | Seagraves et al. |
| 5,567,102 A | * | 10/1996 | Tanaka .................... B65G 57/00 |
| | | | 414/796.4 |
| 5,607,282 A | * | 3/1997 | Brannen .............. B65G 59/062 |
| | | | 414/797.6 |
| 9,718,628 B2 | * | 8/2017 | Redman .................... B65G 1/00 |

(Continued)

FOREIGN PATENT DOCUMENTS

EP    2 165 966 A2    3/2010

OTHER PUBLICATIONS

International Search Report (ISR), Application No. PCT/EP2021/087533, mailed Apr. 8, 2022, 3 pages.

(Continued)

*Primary Examiner* — Mark C Hageman
(74) *Attorney, Agent, or Firm* — Francis J. Maguire; WARE FRESSOLA MAGUIRE & BARBER LLP

(57) ABSTRACT

A device for separating a load (L) from a pallet (P) includes a set of plate elements (3, 5) operated by respective insertion elements (7) for insinuation between the load (L) and a surface of the pallet (P) and operated by respective lifting elements (9) to separate the load (L) from the pallet (P). Right (13) and left (15) mutually parallel side walls are arranged vertically and include a rotation element (11) for each plate element (3, 5) for rotating and orienting the plate elements (3, 5) with respect to the surface of the pallet, with the set of plate elements (3, 5) including a right plate-like element (3) and a left plate-like element (5) each sliding in a respective swivel and slide element (19) of the rotation element (11).

12 Claims, 10 Drawing Sheets

(56) References Cited

U.S. PATENT DOCUMENTS

| | | | |
|---|---|---|---|
| 10,035,666 B2* | 7/2018 | Redman | B65G 1/00 |
| 11,230,442 B2* | 1/2022 | Redman | B65G 59/063 |
| 2006/0056951 A1 | 3/2006 | Williamson et al. | |
| 2022/0073291 A1* | 3/2022 | Piani | B65G 61/00 |
| 2024/0140769 A1* | 5/2024 | Piani | B66F 9/183 |

OTHER PUBLICATIONS

Written Opinion of the International Searching Authority (ISA/EP), Application No. PCT/EP2021/087533, mailed Apr. 8, 2022, 5 pages.

Bibliographic Data from DEPATISnet for EP2165966A2 including English Abstract, 3 pages.

* cited by examiner

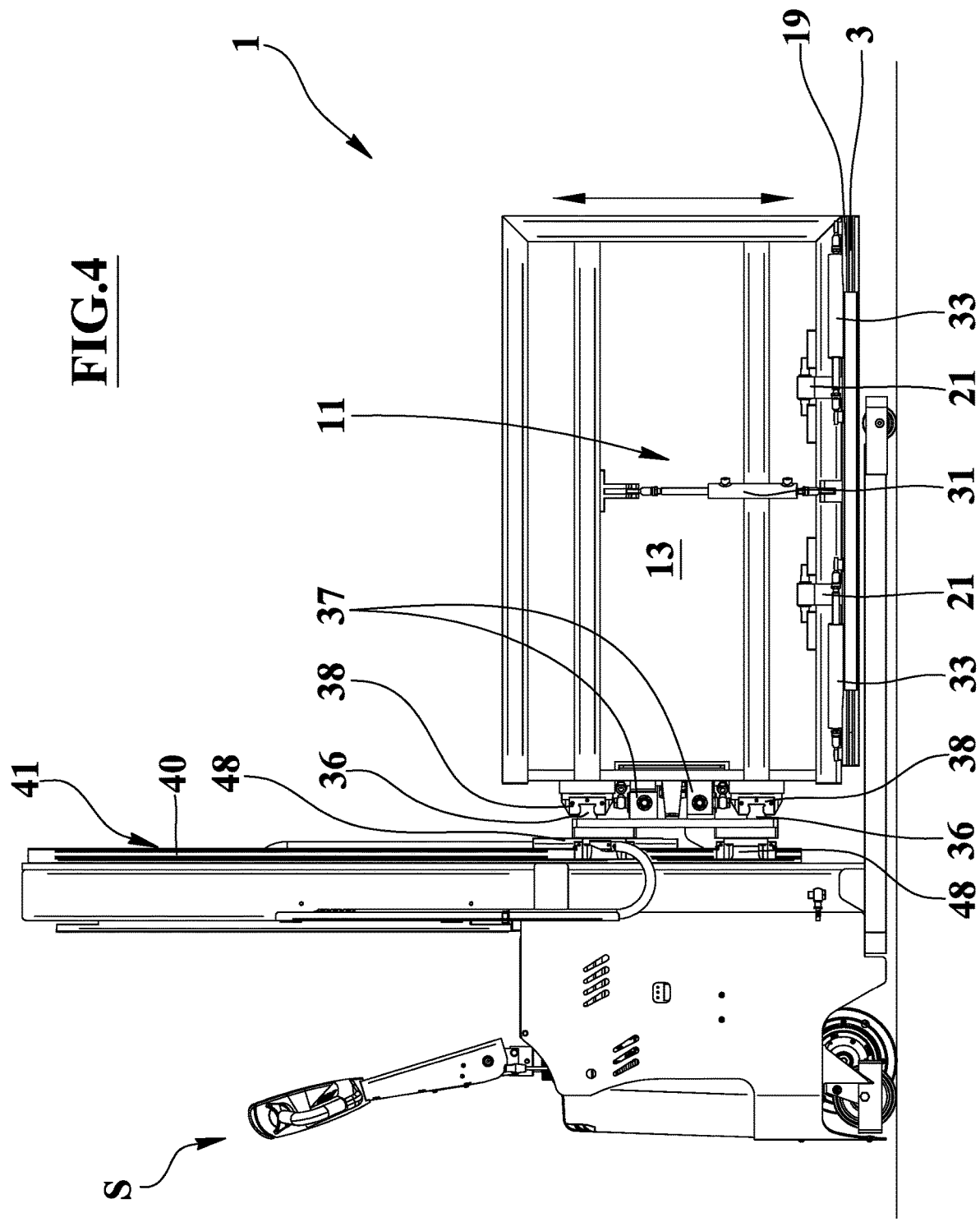

DEVICE FOR SEPARATING A LOAD FROM THE PALLET SUPPORTING IT

TECHNICAL FIELD

The present invention relates to the sector concerning the handling or storage of loads, palletized and not palletized, and more generally is part of the logistics sector; this invention refers to a device for separating a load from the pallet supporting it.

PRIOR ART

Devices for separating the boxed load from the respective pallet of the type fixed to the floor or of the mobile type are know n.

A disadvantage of these known devices consists in the fact that they are complex and very bulky. For example, known mobile devices are subject to severe movement limitations due to their transverse bulk.

Some of these known devices can cause the risk of the load falling and/or damage to the boxes and their contents.

Prior document N. US 2006/056951 A1 discloses a device for separating a load from a pallet according to the preamble of claim 1 of the present document.

DISCLOSURE OF THE INVENTION

An object of the present invention is to propose a device for separating a load from the pallet supporting it relatively simple and capable of assuming a compact configuration with limited bulk.

Another object is to propose a fixed or mobile device able to move easily.

A further object is to propose a device capable of preserving the integrity of the load.

BRIEF DESCRIPTION OF THE DRAWINGS

The characteristics of the invention are below highlighted with particular reference to the accompanying drawings in which:

FIG. 4, FIG. 5, and FIG. 6 respectively illustrate side, front and top views of the device of FIG. 2 in the condition prior to separation;

DETAILED DESCRIPTION OF AN EMBODIMENT OF THE INVENTION

Figure 1:
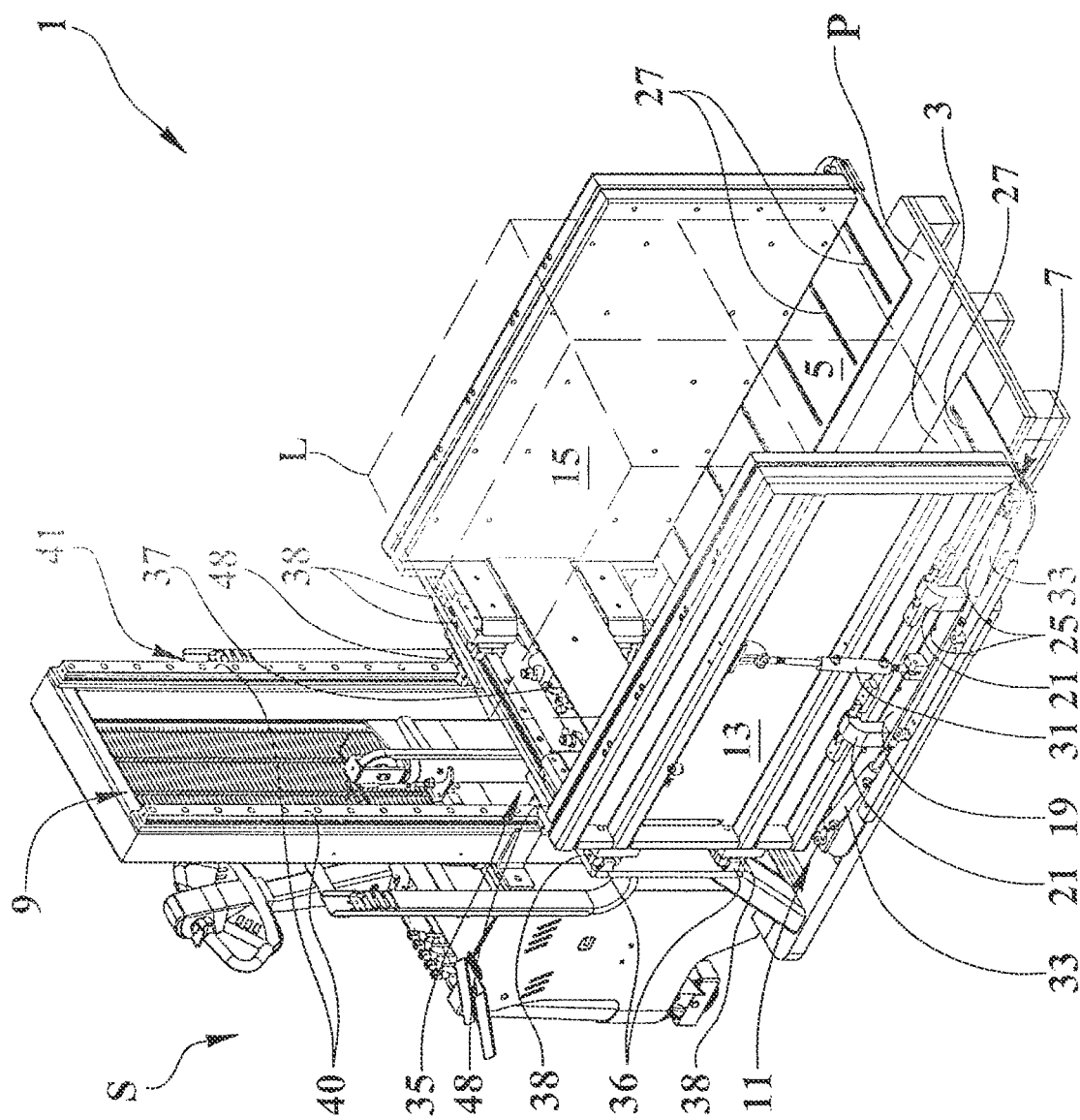
FIG. 1 illustrates an axonometric view of a mobile embodiment of the device for separating a load from the pallet supporting it object of the present invention in which the pallet is partially visible at the bottom and the load is represented by a dashed parallelepiped.
Figure 3:
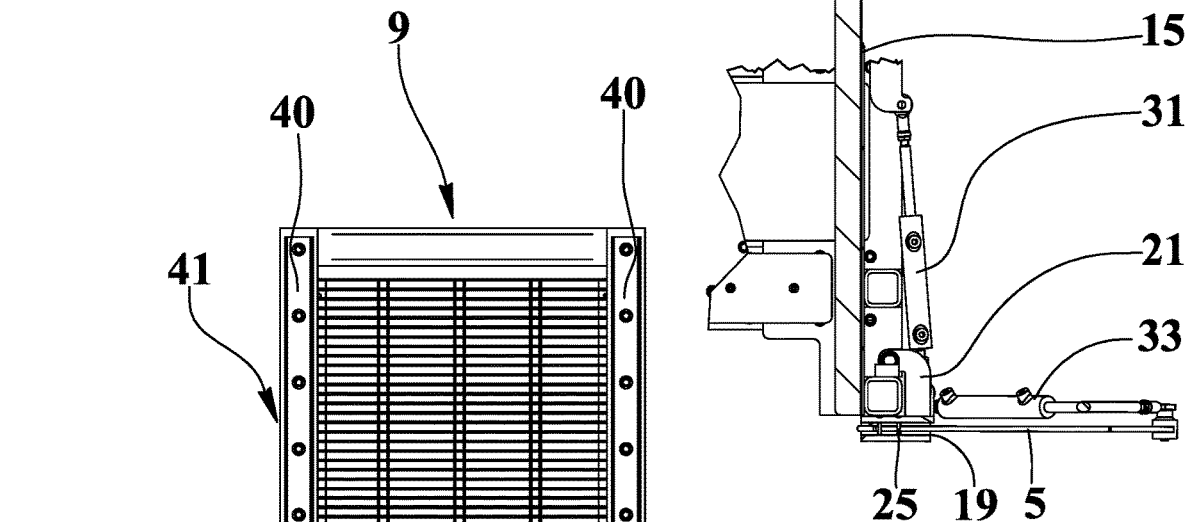
FIG. 3 illustrates a partial and sectional view of a detail of FIG. 2 in a rotated condition prior to separation.
Figure 2:
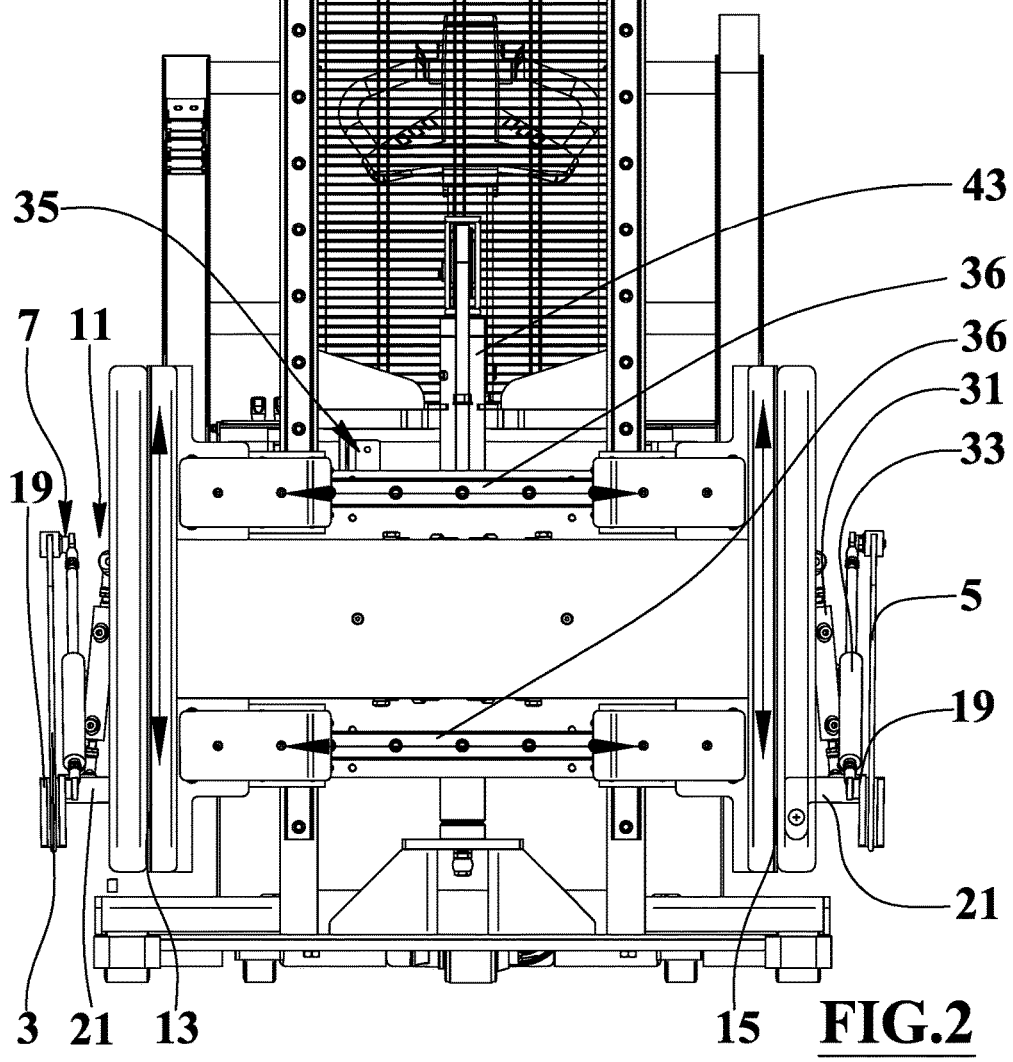
FIG. 2 illustrates a front view of the device of FIG. 1 alone in a moving condition.
Figure 5:
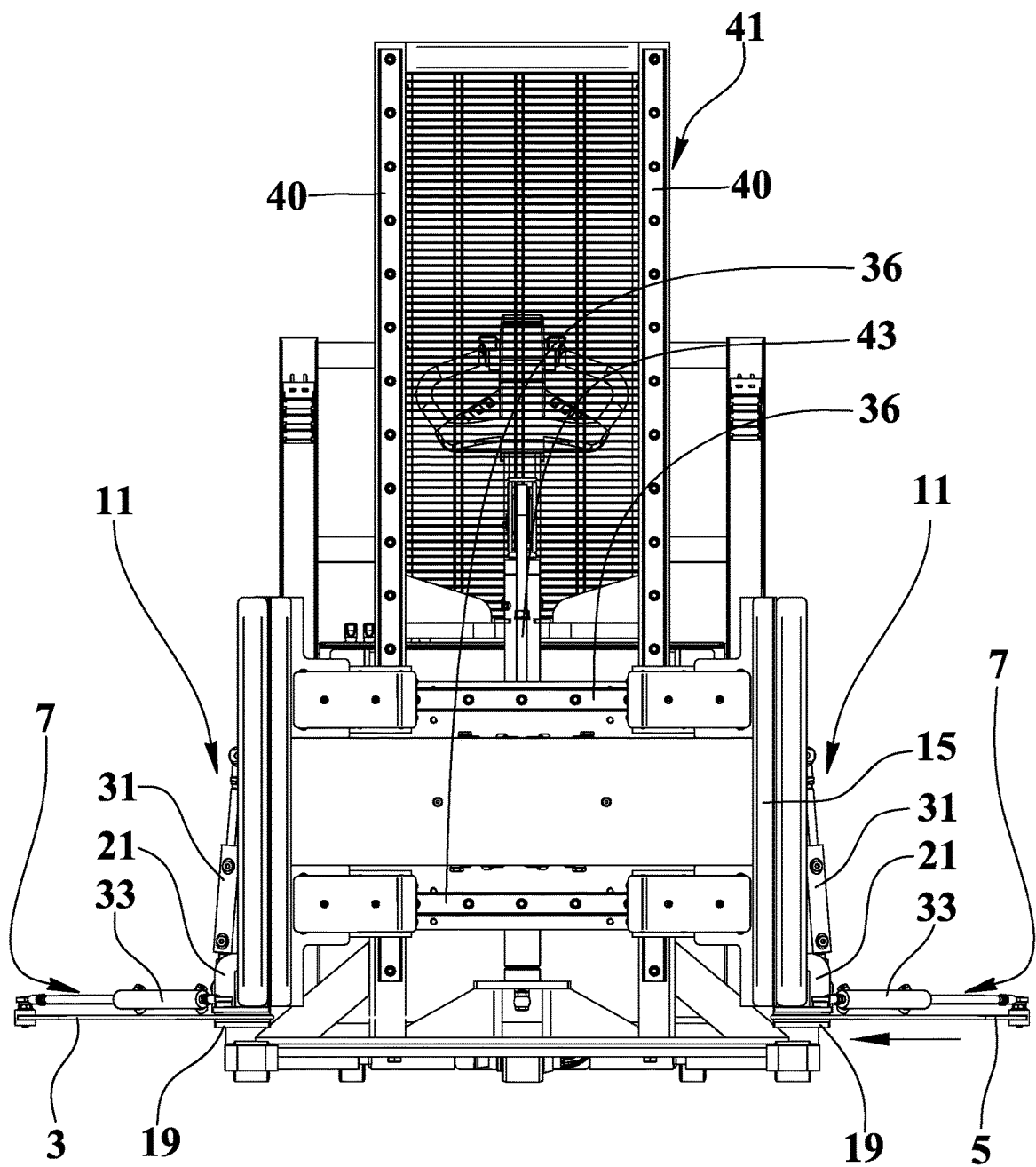
Figure 6:
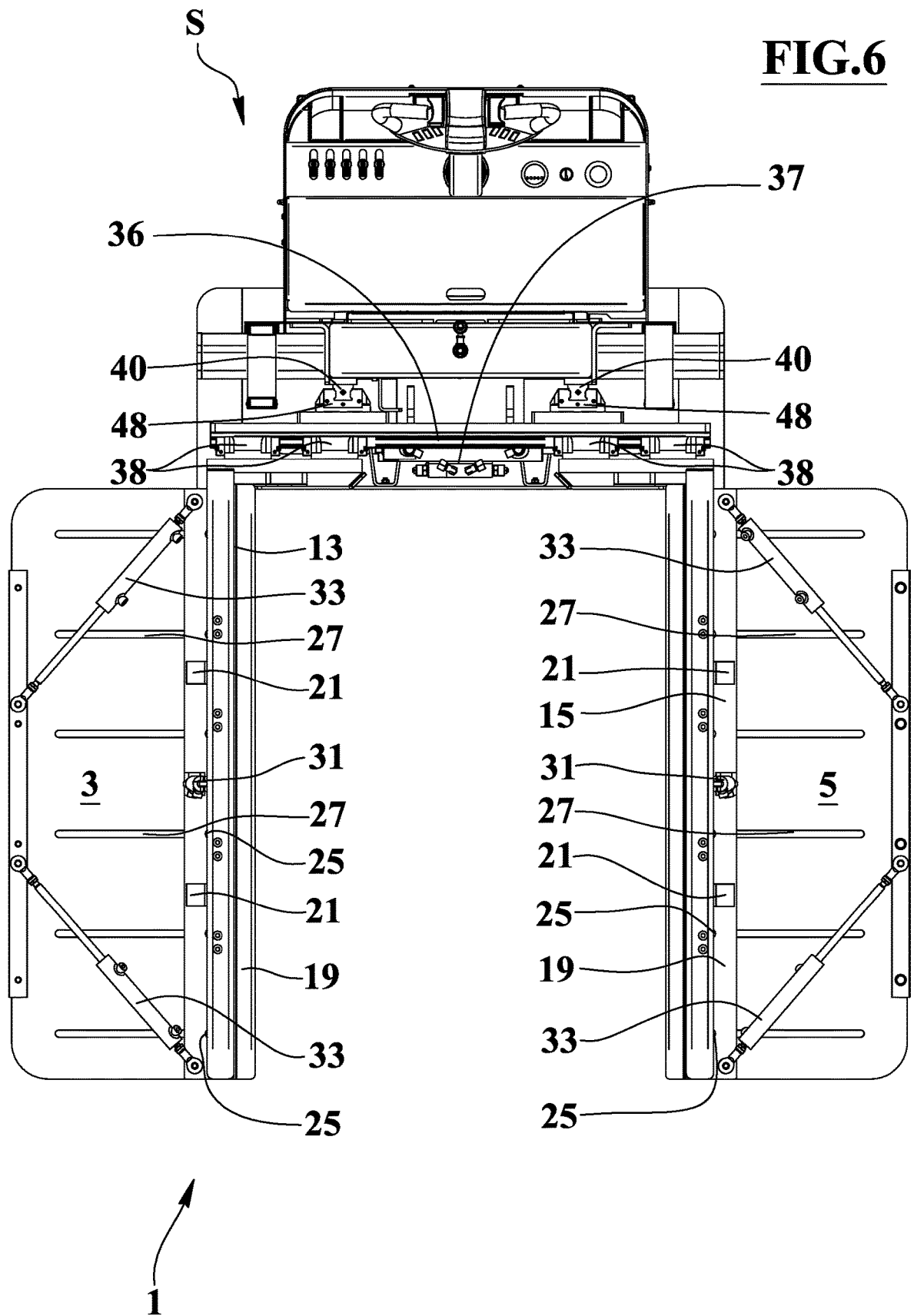
Figure 7:
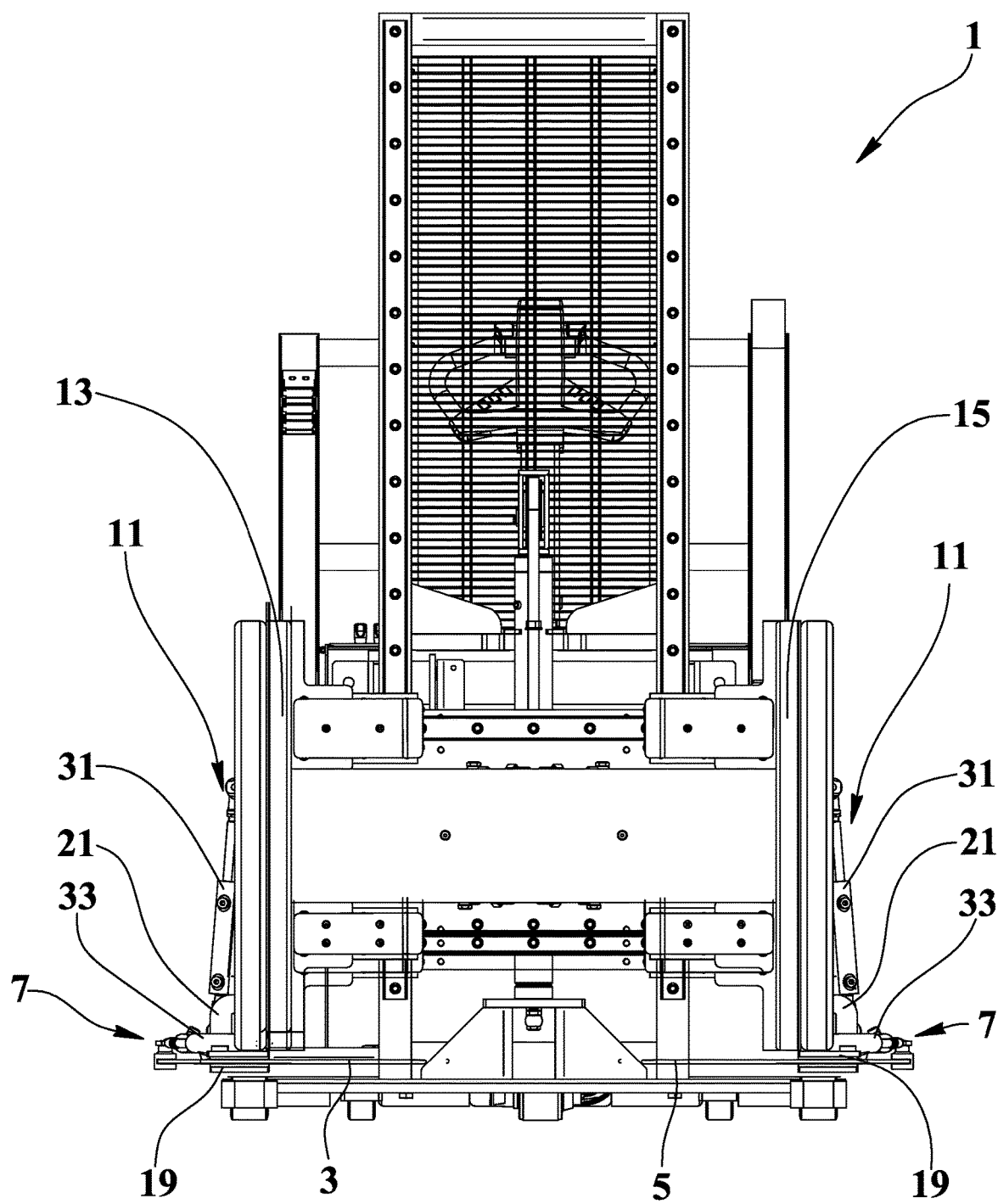
FIG. 7 and FIG. 8 respectively illustrate front and top views of the device of FIG. 2 in a separating condition.
Figure 8:
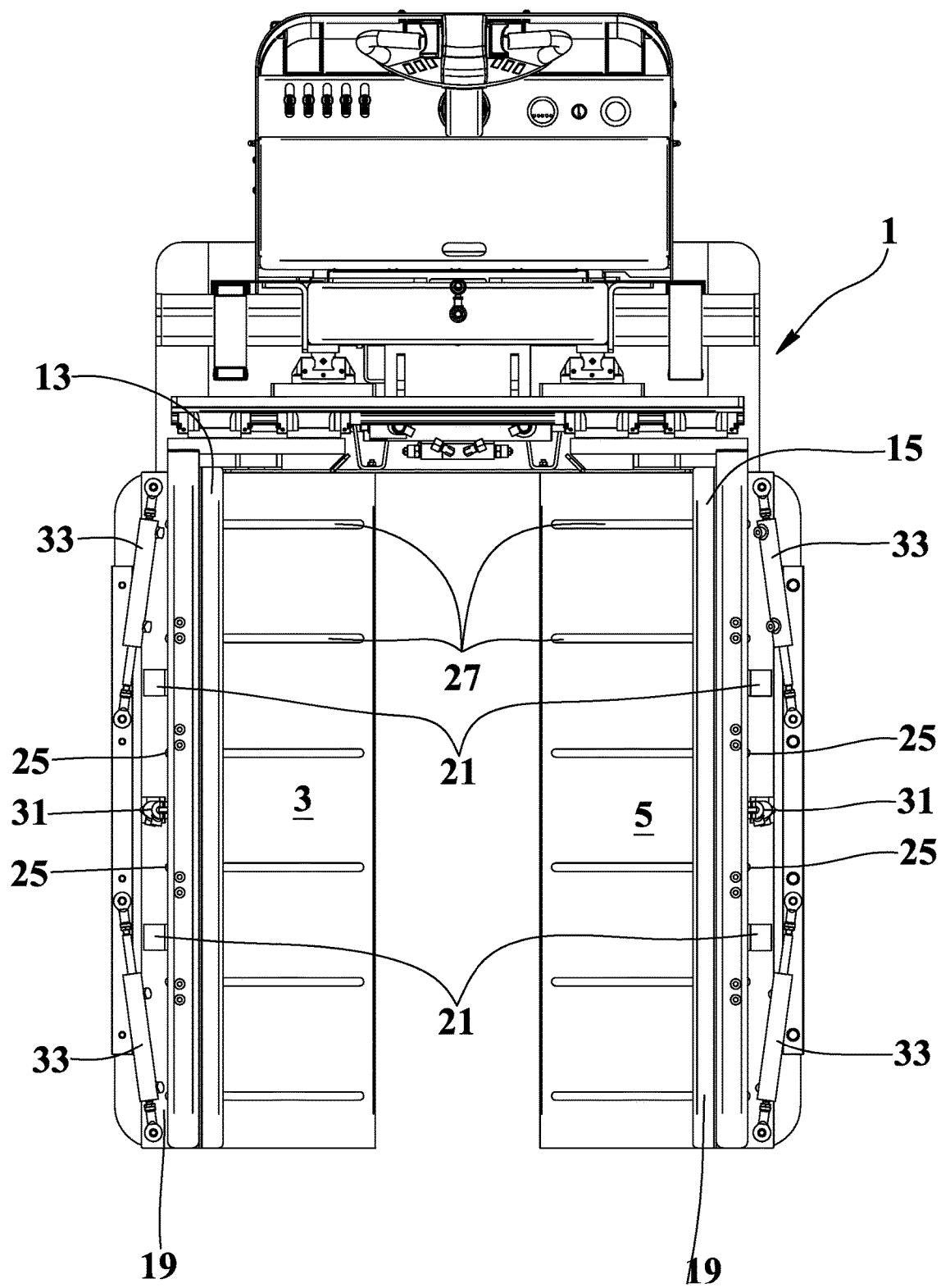
Figure 9:
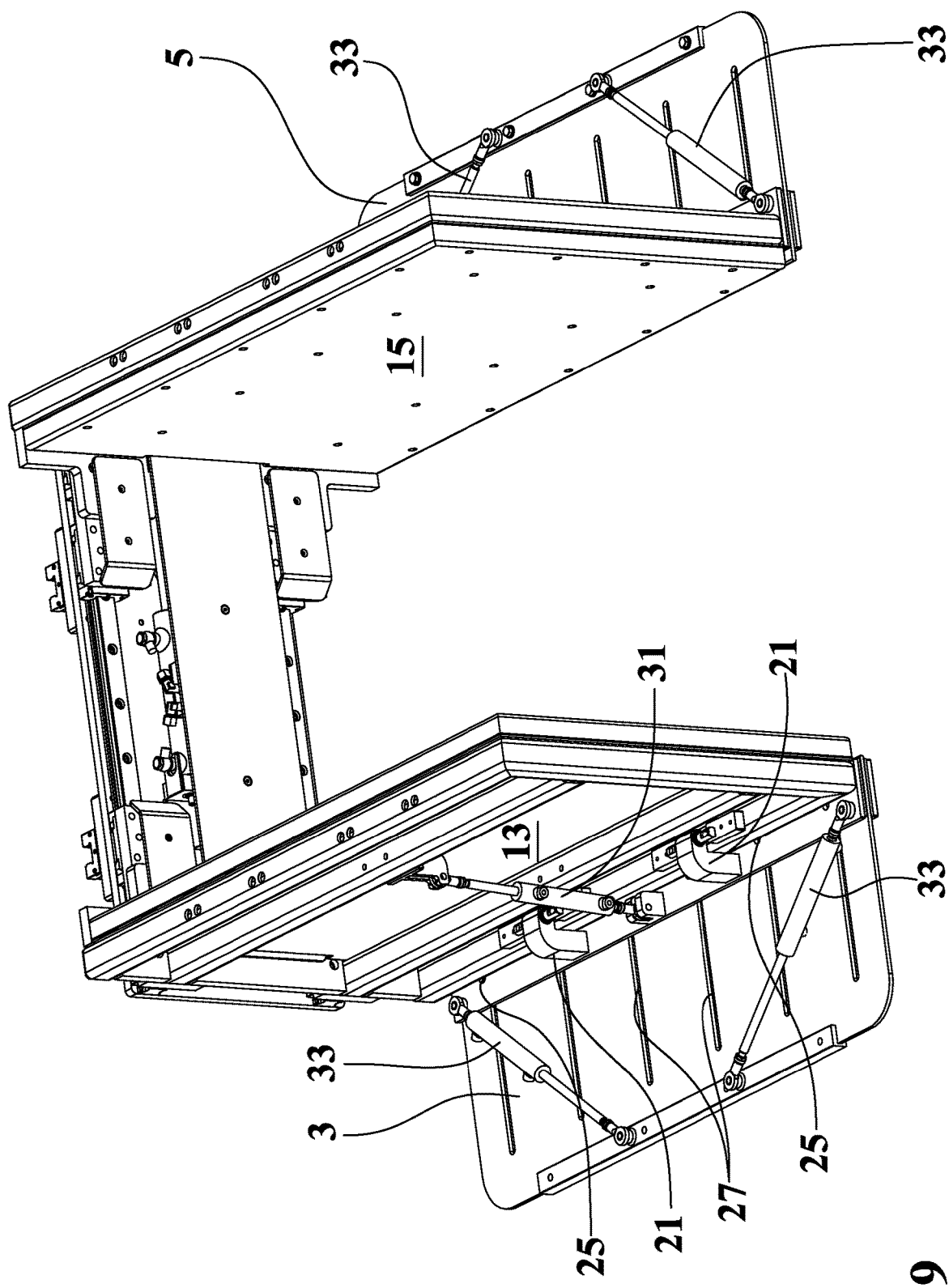
FIG. 9 and FIG. 10 illustrate axonometric, enlarged and partial views of FIG. 5 and FIG. 7, respectively.
Figure 10:
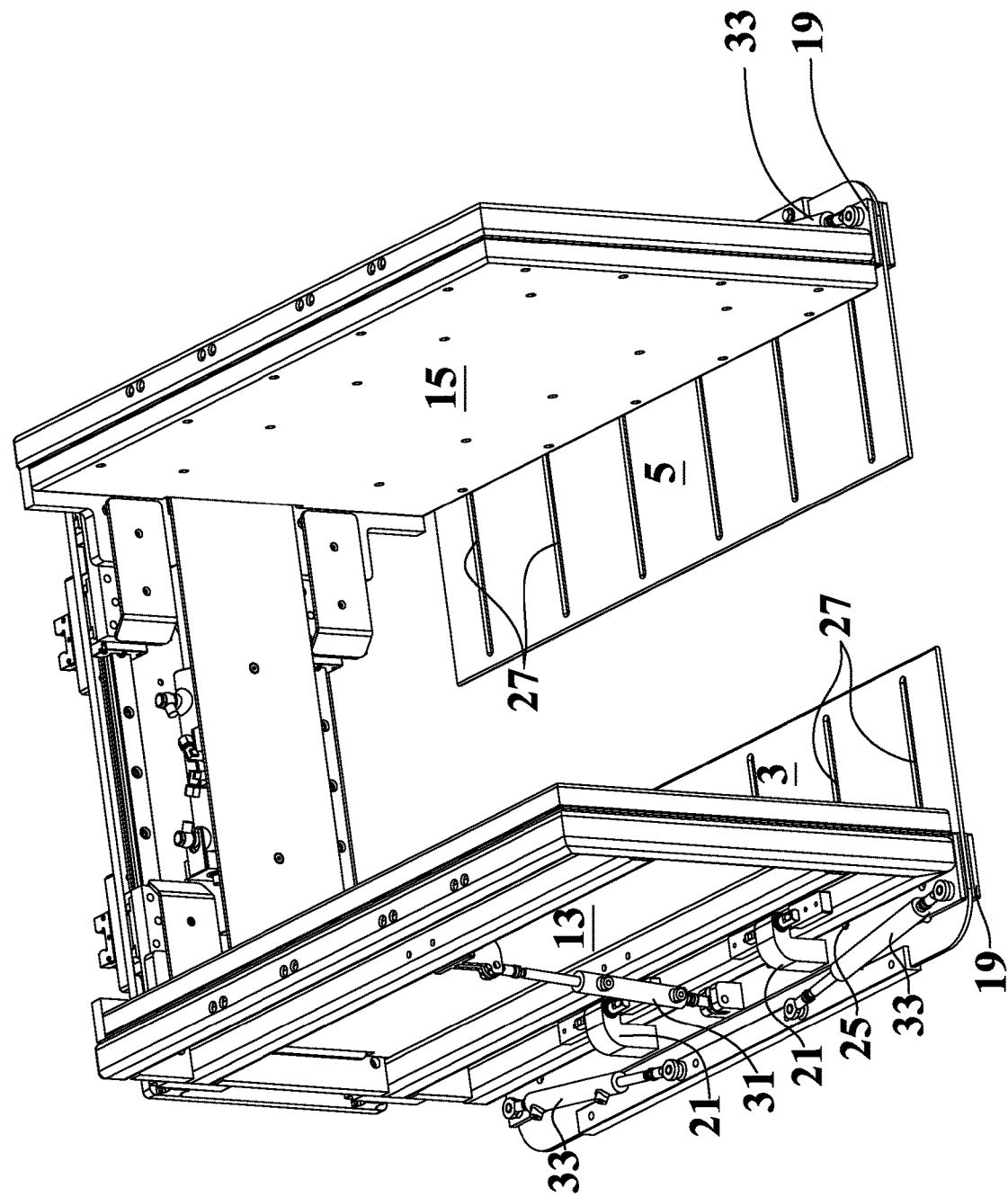

With reference to FIGS. 1 to 12, reference numeral 1 indicates the device for separating a load from the pallet supporting it, the object of the present invention.

The load L can consist of boxes or other packages, possibly wrapped in tape, and has an overall approximately parallelepiped shape with a base almost corresponding to that of the pallet P which can be of any standard or proprietary shape and made of wood, plastic, metal and any other material.

The device 1 comprises at least one set of plate elements 3, 5, comprising a right plate-like element 3 and a left plate-like element 5 each consisting of a preferably metallic plate or slab, of reduced thickness that is constant or decreasing towards a free edge. Alternatively, the plate elements 3, 5 can comprise two pluralities of plates, sheets or slabs, where the plates of each plurality are coplanar, separated by narrow slits and mutually fixed by a joining profile fixed to one of their edges to form a left and a right element.

Each plate or slab element 3, 5 is operated, by respective insertion elements 7, on a common, almost horizontal geometric plane defined by the surface of the pallet P which supports the load L.

Starting from a condition of maximum mutual spacing of the plate elements 3, 5 lying on said horizontal plane and slightly spaced from the load L, the activation of the insertion elements 7 causes the translation of the plate elements 3, 5 in mutual approach; in this way they insinuate between the load L and said surface of the pallet P. A subsequent operation of lifting elements 9 connected to said plate elements 3, 5 translates the latter vertically to separate the load L from the pallet P. The lifting elements 9 may consist of suitable actuators, for example of the linear type, pantograph or the like, interposed between the plate or slab elements 3, 5 and the floor or between these elements and a support structure of the same and fixed to or mobile on the floor. Alternatively, and as illustrated in the figures, the lifting elements 9 may comprise second guiding elements 41 and second actuating elements 43 as will be better explained below.

The device 1 comprises at least one rotation element 11 for each plate element 3, 5 assigned to the rotation of the respective plate element 3, 5 to orient it vertically or perpendicular to said geometric plane starting from their condition of maximum mutual spacing and vice versa for rotating the respective plate element 3, 5 from vertical to horizontal orientation parallel to said geometric plane.

To avoid the risk of the load falling during its separation from the pallet or during any movements, the device is equipped with two side walls, right 13 and left 15, mutually parallel and facing each other, arranged vertically and assigned to face respective opposite side faces of the load L. Preferably, and as illustrated in the accompanying figures, the two side walls right 13 and left 15 can be translated in mutual approach, to clamp the load, and in mutual distancing to release it.

The at least one set of plate elements 3, 5 comprises a right plate-like element 3 and a left plate-like element 5 each sliding in a respective swivel and slide element 19 of the rotation element 11 and connected to the lower edge of the respective side wall right 13 or left 15 in a rotatable way around a horizontal rotation axis parallel to said lower edge.

Each swivel and slide element 19 comprises one or more elongated sections mutually connected and defining a longitudinal cavity for the sliding of the respective side wall 13, 15; the respective rotation element 11 comprises at least one oscillating arm 21, for example in the shape of a "J", preferably a pair of oscillating arms for each rotation element 11. Each oscillating arm 21 has one end, for example the upper one of the "J", fixed to the respective swivel and slide element 19 and the other end pivoted to said lower edge of the respective side wall 13, 15 or to a hinge fixed to said edge. This configuration of the connection of the swivel and slide elements 19 to the respective side walls by means of the oscillating arms 21 allows for the rotation of the swivel and slide elements 19 around said rotation axis so that each plate-like element 3, 5 can rotate between an operating position in which it lies on said geometric plane defined by the horizontal surface of the pallet P and a vertical transfer or rest position, in which it is almost parallel to the respective side wall 13, 15 and external with respect to it.

The elongated and mutually connected section or sections of each swivel and slide element 19 comprises a plurality of pins and/or bushings 25 which transversely cross the longitudinal cavity of the swivel and slide element 19. Each pin and/or bushing 25 is assigned to slide in a respective slot 27 of the corresponding plate-like element 3, 5 at least to guide the sliding of the latter and to reinforce the swivel and slide element 19. Alternatively, each pin and/or bushing 25 slides in the slits between the sheets of each plate-like element 3, 5.

Each rotation element 11 comprises at least one rotation actuator 31 whose ends are respectively connected to the swivel and slide element 19, for example to a hinged pin fixed to the central portion of the swivel and slide element 19, and to a hinged pin fixed to a portion, for example to a longitudinal reinforcement, of the respective side wall 13, 15 for the rotation of the swivel and slide element 19 and of the respective plate-like element 3, 5.

Each insertion element 7 comprises at least one insertion linear actuator 33, preferably two included actuators, the ends of which are separated respectively connected to the corresponding swivel and slide element 19 and to an edge, for example provided with a longitudinal reinforcement, of the respective plate-like element 3, 5 for the sliding of the latter through the longitudinal cavity of the swivel and slide element 19.

Two facing edges of the two side walls right 13 and left 15, for example the edges corresponding to two vertical and smaller sides of the side walls, are slidingly connected to horizontal first guiding elements 35 and are operated by first actuating elements 37 allowing for mutual approach and removal of said side walls 13, 15 to clamp and release the load L.

The first guiding elements 35 comprise at least one horizontal rail 36, preferably two, fixed to a beam or plate, and each horizontal rail 36, continuous or with separate sectors, is engaged by at least one horizontal carriage 38, preferably two, for example with circulating spheres, fixed cantilevered and/or by means of a bracket to the respective side wall 13, 15. Each horizontal carriage 38 is constrained to be able to slide only along the respective horizontal rail.

The first guiding elements 35 are slidingly connected to vertical second guiding elements 41 and are vertically translated by second actuating elements 43 allowing for the raising and lowering of the load L clamped between the side walls 13, 15 and allowing to adjust the minimum height from the ground of the side walls 13, 15 according to the height of the pallet P.

The vertical second guiding elements 41 comprise at least one vertical rail 40, preferably two, fixed to an upright or column. Each vertical rail 40 is engaged by at least one vertical carriage 48, which also in this case can be with circulating spheres, fixed to the beam or plate of the first guiding elements 35.

The upright or column of the second guiding elements 41 can be fixed, creating a load separation station constrained to the floor, or it is mounted on a self-propelled vehicle S, as illustrated in the figures. This vehicle comprises at least one driving and/or steering wheel and at least two front wheels separated by a distance greater than the width of the pallet P and approximately placed under the front portions of the side walls 13, 15 placed at the maximum mutual distance. The vehicle can be equipped with combustion or electric motors for moving the vehicle itself and may include batteries and/or pneumatic or hydraulic sources for operating the actuators 31, 33, 37, 43 with the energy they require. In fact, these actuators can be electric, pneumatic or hydraulic. The rotation actuators 31 can be of the linear type or of the rotary type.

Optionally, the internal faces of the side walls 13, 15 have respective covering plates made of resilient material and with a high friction surface; the faces of the plate elements 3, 5 are made of material or treated to achieve low sliding friction; moreover, the faces of the longitudinal cavity of each swivel and slide element 19 are provided with a coating of a low-friction material to facilitate the sliding of the respective side wall 13, 15, for example each swivel and slide element 19 can comprise, starting on one side thereof, a first elongated metal plate, a second and a third plate mutually separated by the longitudinal cavity, having the same or similar shape as the first plate and made of low-friction and high-resistance material such as nylon (aliphatic polyamide), teflon (polytetrafluoroethylene), delrin (polyoxymethylene) or the like and finally a fourth plate equal to the first one, where the first and second plates and the third and fourth plates are mutually fixed by the pins 25 while the respective bushings 25 or central enlargements of the pins can maintain the second and third plates distanced forming the longitudinal sliding cavity of the respective plate-like element 3, 5. In each slot 27 of each plate-like element 3, 5 a single pin can slide, with or without the respective bushing, or a double pin comprising a pair of spaced rods whose line joining the respective axes is aligned with the slot 25 to ensure a precise guide, without jamming and slidable to the translation of the respective plate-like element 3, 5 in the longitudinal cavity of the swivel and slide element 19.

The operation of the mobile de ice in the figures provides that it is parked or moved with the plate-like elements 3, 5 arranged vertically for minimum bulk and maximum case of use. When a load to be separated from the pallet is placed between the side walk 13, 15, the activation of the first actuating elements 37 causes the mutual approach of these side walls 13, 15 with consequent clamping of the load L; the operation of the right and left rotation actuators 31 causes the rotation of the swivel and slide elements 19 and, with them, of the plate elements 3, 5 which are thus arranged onto the horizontal geometric plane of the pallet loading surface; the subsequent actuation of the insertion linear actuators 33 causes the intrusion of the right and left plate elements 3, 5 between the pallet P and the load L. The separation is then obtained by lifting the plate-like elements 3, 5 and the side walls 13, 15 by activating the second actuating elements 43.

Figure 11:
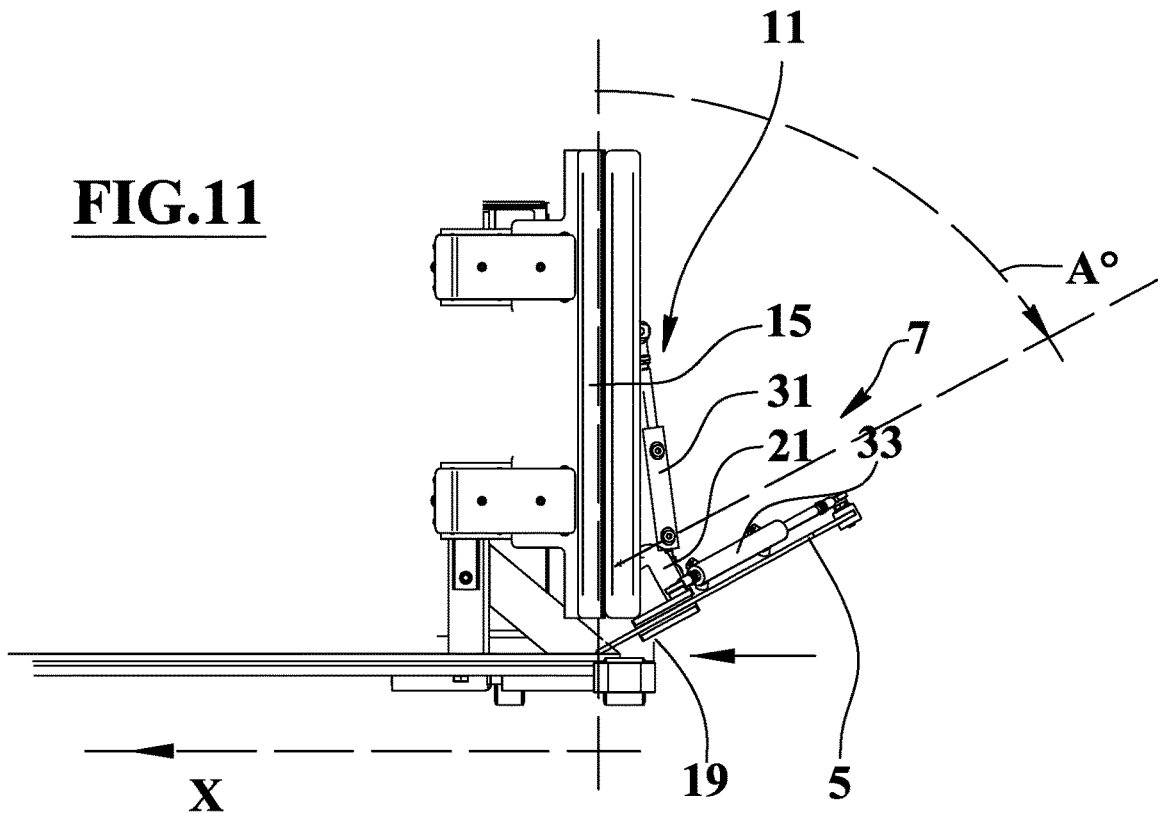
FIG. 11 and FIG. 12 illustrate partial front views of a detail of FIG. 2 in a moving condition.
Figure 12:
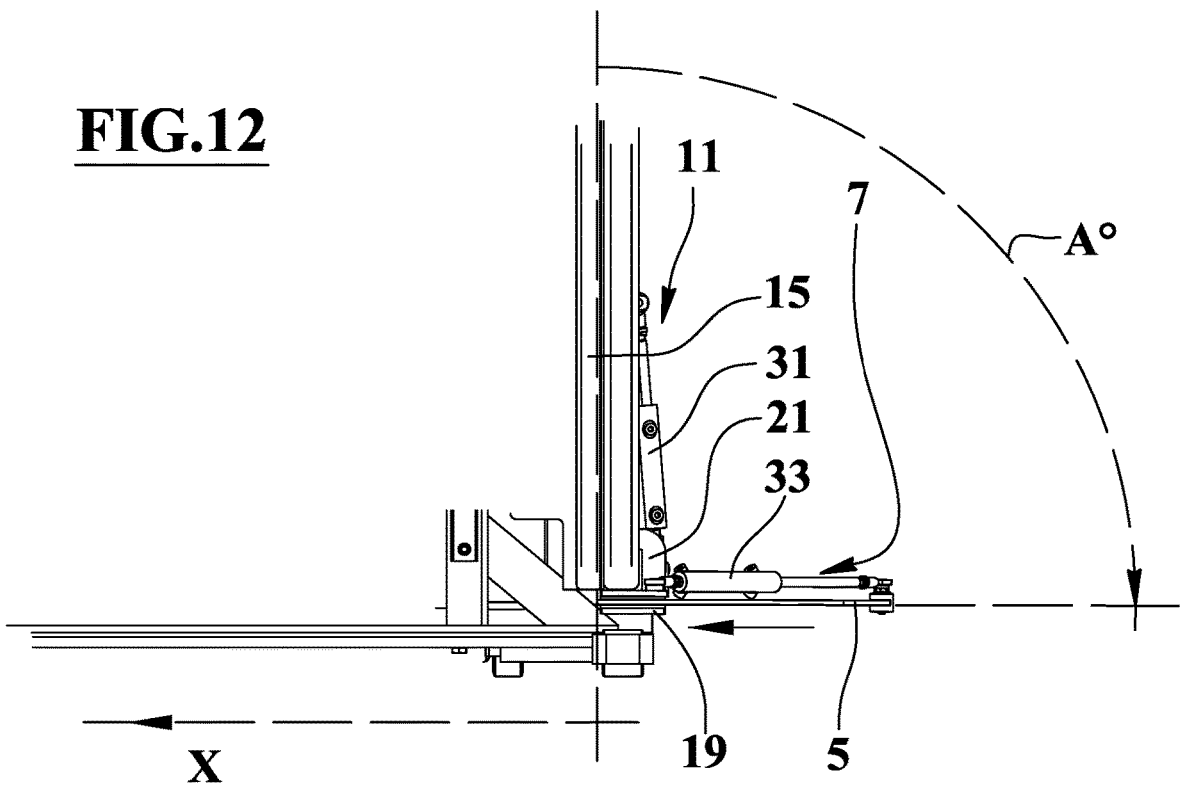

In a variant of the device 1 illustrated in FIG. 11 and FIG. 12, the rotation actuators 31 and the linear insertion actuators 33 are of the electric, hydraulic or other type, such that their control and operation allows to regulate with continuity respectively the incline angle A of the swivel and slide elements 19 and of the respective right 3 and left 5 plate-like elements with respect to the surface of the pallet P and the sliding of the internal edge of the right 3 and left 5 plate-like elements along the respective transverse coordinate X lying on said geometric plane defined by the surface of the pallet P; this allows for varying the inclination of these plate-like elements 3, 5 as a function of the transverse position X of their internal edge.

The transverse coordinates X of the right 3 and left 5 plate-like elements point towards each other so that each one increases in value with the entry of the respective plate-like element 3, 5 under the load. The transverse coordinates X of the plate-like elements 3, 5 lie on the same line which is almost orthogonal to the side walls 13, 15. The transverse position of the internal edge of the plate-like elements 3, 5 coincides with the vertical projection of this internal edge on the transverse coordinate X. The angle A is measured between the surface of a swivel and slide element 19, or between the sheet-like element, and the respective side wall.

An operator of the device 1 can thus manually and independently control the rotation actuators 31 and the insertion linear actuators 33 so as to optimize the incline of the plate-like elements 3, 5 when they are inserted between the load L and the pallet P and when such plate-like elements 3, 5 advance transversely. For example, the operator can adjust the angle A to a value between 70° and 85° when inserting the plate-like elements 3, 5 between the pallet and the slightly raised load, and then gradually bring it to approximately 90° as the plate-like elements 3, 5 penetrate under the load or as the respective coordinates X increase. This greatly facilitates the insertion of the plate-like elements 3, 5 between the surface of the pallet P and the load L.

Optionally, the device 1 also comprises sensor elements 50, 51 for detecting the angle A of incline and the transverse coordinate X of the position of each plate element 3, 5. These sensor elements 50, 51 can be directly associated with the plate elements 3, 5 or they can also be attached to other parts of the device 1.

The device 1 can also comprise a control unit 52 for instance in the form of the operator handle shown behind the vertical rails 40 in FIG. 1 and FIG. 4 at the end of an operator control arm of the self-propelled vehicle S to which at least the rotation actuators 31 and the insertion linear actuators 33 and the sensor elements 50, 51 are connected, to control the inclination of each plate element 3, 5 as a function of the corresponding sliding along the transverse coordinate X according to a predetermined programmable function in the control unit 52, to facilitate the insertion of the plate elements 3, 5 between the pallet P and the load L.

When the control unit 52 is connected to the actuators 31, 33 and to the sensor elements 50, 51 of the angle A and of the transverse position X, the adjustment of the inclination A as a function of the transverse position X (or vice versa) of the plate elements 3, 5 can take place automatically with feedback. When the control unit 52 is connected to the sensor elements 50, 51 and only to some of the actuators 31, 33, it is possible to adjust the inclination A and/or the transverse position X by means of an automatic open loop control, i.e. predictive, for example by knowing in advance parameters such as the linear sliding speed of the insertion linear actuators 33 or the angular speed of the rotation actuators 31.

The invention claimed is:

1. A device for separating a load (L) from a pallet (P) on ground supporting the load, comprising at least one set of plate elements (3, 5) operated by respective insertion elements (7) at least on a geometric plane defined by a surface of the pallet (P) supporting the load (L) to insinuate the at least one set of plate elements between the load (L) and said surface of the pallet (P) and operated by respective lifting elements (9) to separate the load (L) from the pallet (P); said device further comprising two side walls, a right side wall (13) and a left side wall (15), mutually parallel, arranged vertically to face respective opposite side faces of the load (L) and at least one rotation element (11) for each plate element (3, 5) configured to rotate and orient said at least one set of plate elements (3, 5) with respect to said geometric plane, with said at least one set of plate elements (3, 5) comprising a right plate-like element (3) and a left plate-like element (5) each sliding in a respective swivel and slide element (19) of the at least one rotation element (11), where each swivel and slide element (19) is connected to a lower edge of the respective right side wall (13) or left side wall (15) in a rotatable way around a horizontal rotation axis parallel to said lower edge.

2. The device according to claim 1, wherein each swivel and slide element (19) comprises one or more elongated sections mutually connected and defining a longitudinal cavity for the sliding of the respective side wall (13, 15) and the respective rotation element (11) comprises at least one oscillating arm (21), each having one end fixed to the respective swivel and slide element (19) and the other end pivoted to said lower edge of the respective side wall (13, 15) for said rotation around said rotation axis so that each plate-like element (3, 5) can rotate between a position in which it lies on said geometric plane defined by the surface of the pallet (P) and a vertical position in which it is substantially parallel to the respective side wall (13, 15) and external to it.

3. The device according to claim 2, wherein the one or more mutually connected elongated sections of each swivel and slide element (19) comprises a plurality of pins and/or bushings (25) which transversely cross the longitudinal cavity of the swivel and slide element (19) where each pin and/or bushing (25) is assigned to slide in a respective slot (27) of the corresponding plate-like element (3, 5) at least to guide sliding of the corresponding plate-like element.

4. The device according to claim 2, wherein each rotation element (11) comprises at least one rotation actuator (31) with ends respectively connected to the swivel and slide element (19) and to a portion of the respective side wall (13, 15) for the rotation of the swivel and slide element (19) and of the respective plate-like element (3, 5) and wherein each insertion element (7) comprises at least one insertion linear actuator (33) having ends respectively connected to the corresponding swivel and slide element (19) and to the respective plate-like element (3, 5) for the sliding of the respective plate-like element through the longitudinal cavity of the corresponding swivel and slide element (19).

5. The device according to claim 4, wherein the rotation actuators (31) and the insertion linear actuators (33) are controlled and operated to continuously adjust respectively an angle (A) of inclination of the swivel and slide elements (19) and of the respective right plate element (3) and left plate element (5) with respect to the surface of the pallet (P) and the sliding along the respective transverse coordinate (X) of the internal edge of the right plate-like element (3) and left plate-like element (5) along said geometric plane defined by the surface of the pallet (P) to vary inclination of the plate-like elements (3, 5) as a function of the transverse position (X) of the corresponding internal edge.

6. The device according to claim 5, further comprising sensor elements (50, 51) for detecting the angle (A) of inclination and the transverse coordinate (X) of the position of each plate element (3, 5).

7. The device according to claim 6, further comprising a control unit (52) connected to one or more of the rotation actuators (31), the insertion linear actuators (33), and the sensor elements (50, 51) are connected to control the inclination of each plate element (3, 5) as a function of respective sliding along the transverse coordinate (X) according to a predetermined programmable function in the control unit (52), to facilitate the insertion of the plate elements (3, 5) between the pallet (P) and the load (L).

8. The device according to claim 1, wherein two facing edges of the right side wall (13) and the left side wall (15), are slidingly connected to horizontal first guide elements (35) and are operated by first actuating elements (37) allowing for mutual approach and removal of the right side wall (13) and the left side wall (15) to clamp and release the load (L).

9. The device according to claim 8, wherein the first guiding elements (35) are slidingly connected to vertical second guiding elements (41) and are vertically translated by second actuating elements (43) allowing for raising and lowering the load (L) clamped between the side walls (13, 15) and allowing to adjust a minimum height from the ground of the side walls (13, 15) according to a height of the pallet (P).

10. The device according to claim 8, wherein the first guiding elements (35) comprise at least one horizontal rail (36) fixed to a beam or plate and that each horizontal rail (36), continuous or with separate sectors, is engaged by at least one horizontal carriage (38) fixed cantilevered and/or by means of a bracket to the respective side wall (13, 15), where each horizontal carriage (38) is constrained to slide along the respective horizontal rail (36), and in that the vertical second guide elements (41) comprise at least one vertical rail (40) fixed to an upright or column and that each vertical rail (40) is engaged by at least one vertical carriage (48) fixed to the beam or plate of the first guiding elements (35).

11. The device according to claim 10, wherein the upright or column of the second guiding elements (41) is fixed or is mounted on a self-propelled vehicle(S) having a control unit (52) with at least one driving and/or steering wheel and having at least two front wheels separated by a distance greater than the width of the pallet (P) and approximately placed under the front portions of the side walls (13, 15) placed at the maximum mutual distance.

12. The device according to claim 10, wherein internal faces of the side walls (13, 15) have respective covering plates in resilient material and with a high friction surface, wherein faces of the plate elements (3, 5) are made of material or treated to achieve a low sliding friction, and wherein faces of the longitudinal cavity of each swivel and slide element (19) are equipped with respective low-friction elements or with low-friction material coatings to facilitate the sliding of the respective side wall (13, 15).

* * * * *